US005677732A

United States Patent [19]

Moon

[11] Patent Number: 5,677,732
[45] Date of Patent: Oct. 14, 1997

[54] AUTOMATED APPARATUS AND METHOD FOR PRODUCING A BUS-CONTROLLED TELEVISION

[75] Inventor: Kyung-ho Moon, Seongnam, Rep. of Korea

[73] Assignee: Samsung Electronics Co., Ltd., Kyungki-do, Rep. of Korea

[21] Appl. No.: 575,866

[22] Filed: Dec. 20, 1995

[30] Foreign Application Priority Data

Jan. 20, 1995 [KR] Rep. of Korea .................. 95-953

[51] Int. Cl.$^6$ ............................................... H04N 17/04
[52] U.S. Cl. ..................................... 348/190; 348/92
[58] Field of Search ........................ 348/189, 190, 348/177, 180, 92, 94, 95, 125; 364/514 B; H04N 17/04

[56] References Cited

U.S. PATENT DOCUMENTS

| | | | |
|---|---|---|---|
| 2,648,724 | 8/1953 | Enslein | 348/190 |
| 4,654,700 | 3/1987 | Davidson et al. | 348/190 |
| 5,369,432 | 11/1994 | Kennedy | 348/189 |
| 5,432,548 | 7/1995 | Byeu et al. | 348/92 |
| 5,442,391 | 8/1995 | Hung et al. | 348/190 |

*Primary Examiner*—Victor R. Kostak
*Attorney, Agent, or Firm*—Sughrue, Mion, Zinn, Macpeak & Seas, PLLC

[57] ABSTRACT

An automated apparatus for producing and testing a bus-controlled television includes a camera, a bus control facility, an automatic connector, and a remote controller. The camera photographs a predetermined area near the automated apparatus and outputs an approach detection signal indicating if the television is located in such area. Also, the camera photographs the screen of the television when it is in the predetermined area and outputs a screen state signal which represents the information displayed on the screen. The bus control facility generates a television test signal based on the approach detection signal and transmits remote control signals to the television to select control items for testing various functions of the television. The automatic connector connects the television and the bus control facility when the television is located in the predetermined area to enable the bus control facility to transmit the television test signal to the television. The remote controller inputs the remote control signals from the bus control facility and transmits corresponding remote control signals to the television for controlling the various functions of the television. As the various functions are being performed, the camera photographs the screen and outputs corresponding screen state signals, and the bus control facility can determine if the data of the control items are correct and if the television is properly functioning based on the screen state signals output from the camera.

15 Claims, 3 Drawing Sheets

AUTOMATED APPARATUS AND METHOD FOR PRODUCING A BUS-CONTROLLED TELEVISION

FIELD OF THE INVENTION

The present invention relates to an automated apparatus and method for producing a bus-controlled television. More particularly, the present invention relates to an apparatus and method for enabling the high-speed automated production of a bus-controlled television in a factory which contains a bus control facility.

BACKGROUND OF THE INVENTION

A conventional television comprises a microcomputer (or system controller) and several function control units which control various functions of the television. Examples of function control units may include a multi voice processor, a voice signal processor, a video signal processor, a teletext circuit, and a picture-in-picture circuit.

In order to instruct the television to perform a particular function, the microcomputer outputs a control signal to a selected function control unit via a corresponding control port, and the selected function control unit performs the corresponding function in accordance with the control signal. However, since the microcomputer cannot perform other functions while controlling the selected function control unit, the processing time of the microcomputer increases. Also, as the number of function control units increases, the amount of commands and instructions output from the microcomputer increases, and thus, the processing time of the microcomputer further rises. In addition, if the number of function control units is high, the wiring connections among the units and the microcomputer become more complex, and the amount of area on the printed circuit board and number of components required to implement the control units likewise increase. Furthermore, as the design of the above system becomes more difficult, the reliability of the system decreases.

In order to reduce the complexity and increase the reliability of the conventional television, the function control units and microcomputer may be connected via various buses. In particular, the microcomputer and the control units may be connected via bi-directional serial data and serial clock lines. Also, each function control unit may be assigned a specific address so that the microcomputer can instruct a particular function control unit to perform a particular function by outputting address and control data that correspond to the particular control unit. The above described system is referred to as an I$^2$C bus system and the above described television is referred to as a bus-controlled television.

In order to produce and test the bus-controlled television mentioned above, a factory may be equipped with a bus control facility (e.g. a bus controller) 3 as shown in FIG. 1. Specifically, the bus control facility 3 and the bus-controlled television 1 are connected together via a bus connector. In order to ensure that the function control units of the television are operating properly, an operator varies the preset values for the television 1 by outputting a television test signal to the television 1 via a television test signal cable. Subsequently, a camera 2 detects the characters and other information displayed on the screen of the television 1 in response to the television test signal and outputs a resultant signal to the bus control facility 3. Subsequently, if the displayed information is improper, the operator must adjust the preset values until the characters displayed by the television 1 are correct. However, since the adjustment procedure illustrated above is not automated, it is time consuming and thus, increases the time to manufacture and test the television 1.

SUMMARY OF THE INVENTION

Accordingly, it is an object of the present invention to provide an automated production apparatus and method for producing a television which can automatically test various functions of the television to ensure that the television is operating properly.

To accomplish the above object, an automated production apparatus for producing a bus-controlled television having a microcomputer and function control units which are connected to said microcomputer is provided. The automated production apparatus includes:

a camera, wherein the camera photographs a predetermined area near the automated production apparatus and outputs an approach detection signal indicating whether or not the television is located within the predetermined area and wherein the camera photographs information displayed on a screen of the television when the television is located at a predetermined position within the predetermined area and outputs a screen state signal based on the information;

a bus control facility which inputs the approach detection signal and the screen state signal and generates a television test signal, a first remote control signal for setting the television in an automatic factory mode, a second remote control signal for selecting a selected control item of a plurality of control items, and a connection control signal, wherein the connection control signal is generated in accordance with the approach detection signal and indicates when the television is within the predetermined area and wherein the plurality of control items control operations of the function control units;

an automatic connector which inputs the television test signal and the connection control signal and establishes a connection between the bus control facility and the television when the television is located within the predetermined area so that the television test signal can be transmitted to the television via the automatic connector; and a remote controller which receives the first and second remote control signals from the bus control facility and outputs first and second function remote control signals to the television, wherein the first function remote control signal sets the television in the automatic factory mode and the second function remote control signal represents the selected control item for controlling functions of the function control units.

To accomplish another object of the present invention, a method of testing various functions performed by a bus-controlled television by utilizing control items is provided. The television is producedby an automated production apparatus having a bus control facility, and the control items control the various functions to be tested. The method comprises the steps of: (a) sensing if the television has moved into a predetermined area located near the automated production apparatus; (b) generating a television test signal via the bus control facility and transmitting the television test signal to the television when the television has moved into the predetermined area; (c) generating a first remote control signal and transmitting the first remote control signal to the television when the television has moved into the predetermined area, wherein the first remote control signal sets the television into an automatic factory mode which enables the various functions to be tested; (d) generating a second remote control signal and transmitting the second remote control signal to the television, wherein the second remote control signal selects a selected control item of the control items when the television is set in the automatic factory mode; (e) causing the television to perform a function of the various functions in accordance with control data corresponding to the selected control item; (f) determining if the function has been properly performed in accordance with the control data; (g) if the function has not been properly performed in accordance with the control data, (g1) generating an adjustment remote control signal and transmitting the adjustment remote control signal to the television, wherein the adjustment remote control signal indicates an amount by which to adjust the control data; (g2) adjusting the control data to produce new control data based on the adjustment remote control signal, wherein the new control data corresponds to the selected control item; (g3) causing the television to perform the function in accordance with the new control data; (g4) determining if the function has been properly performed in accordance with the new control data; (g5) repeating the steps (g1) to (g4) if the function has not been properly performed in accordance with the new control data; (g6) designating the new control data as preset control data for the selected control item if the function has been properly performed in accordance with the new control data; (h) if the function has been properly performed in accordance with the control data, designating the control data as the preset data; and (i) storing the preset data of the selected control item.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

Figure 1:
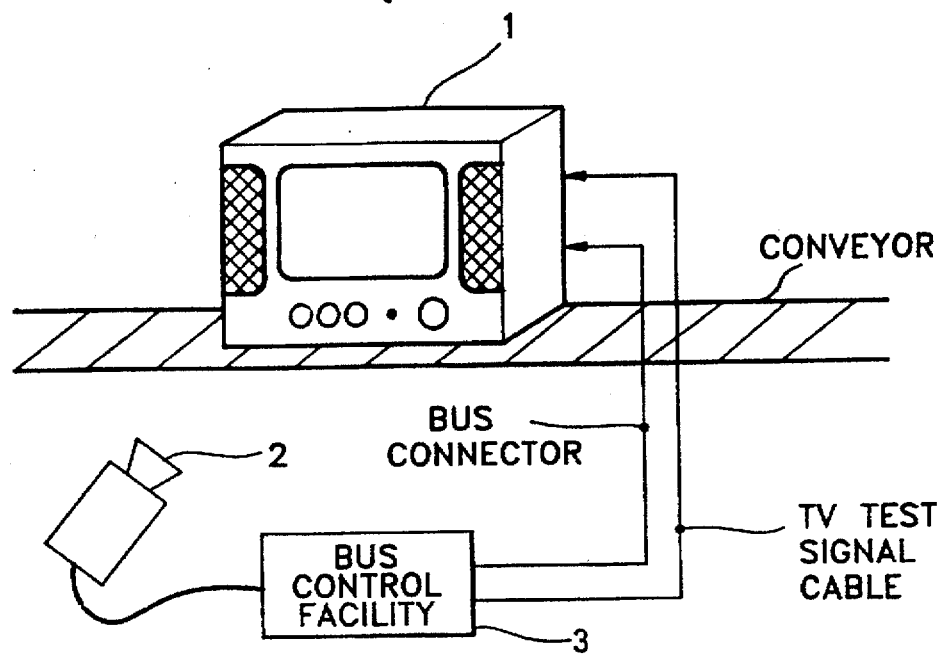
FIG. 1 illustrates a bus control facility used for producing a bus-controlled television.
Figure 2:
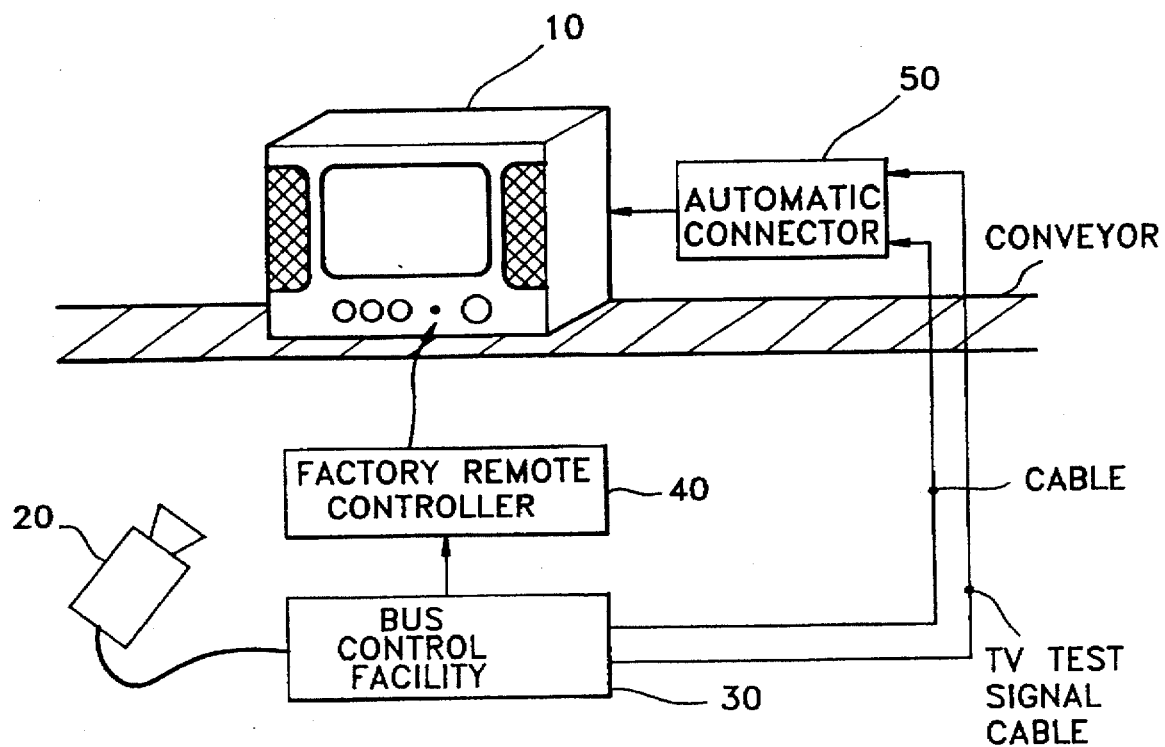
FIG. 2 illustrates an automated apparatus for producing a bus-controlled television according to the present invention.

FIG. 2 is a schematic diagram illustrating an automated apparatus for producing a bus-controlled television in accordance with one embodiment of the present invention. As illustrated in the figure, the apparatus comprises a bus-controlled television 10, a camera 20, a bus control facility 30, a factory remote controller 40, and an automatic connector 50.

The camera 20 senses if a conveyor has moved the television near the controller 40 and outputs a sensing signal to the bus control facility 30 when the television is appropriately positioned. The bus control facility 30 also transmits a remote control signal to the factory remote controller 40 and transmits a television test signal to the connector 50 via a television test signal cable. In accordance with the remote control signal, the factory remote controller 40 outputs a function control signal to the television 10 to instruct the television 10 to perform various functions. Similarly, the automatic connector 50 outputs a signal to the television 10 based on the television test signal. In addition, the connector 50 inputs a control signal from the bus control facility 30 via a control cable and connects or disconnects the television 10 and the bus control facility 30 based on the control signal.

Figure 3:
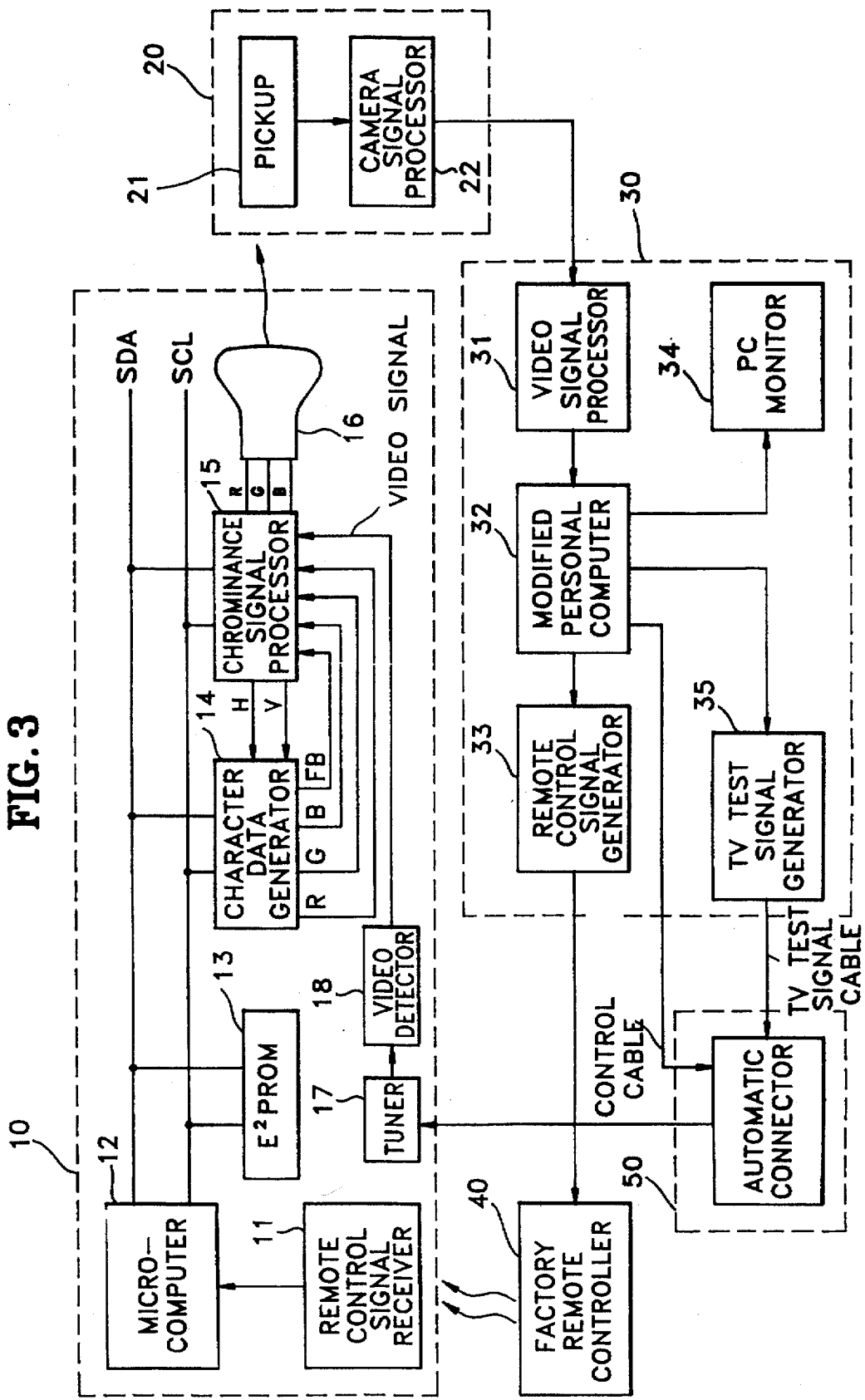
FIG. 3 is a block diagram further illustrating the automated apparatus of FIG. 2.

FIG. 3 is a block diagram which illustrates the components shown in FIG. 2 in more detail. As shown in the figure, the television 10 comprises a remote control signal receiver 11, a microcomputer 12, an $E^2PROM$ 13, a character data generator 14, a chrominance signal processor 15, a cathode ray tube (CRT) 16, a tuner 17, and a video detector 18.

The remote control signal receiver 11 receives the remote control signal output from the factory remote controller 40 and outputs a corresponding signal to the microcomputer 12. The microcomputer 12 inputs the signal from the receiver 11 and selects one of a plurality of control items which corresponds to the signal. In the illustrative embodiment, the control items represent various routines or procedures that are performed by one or more of the function control units to determine if the control units are operating properly. For instance, one control item may instruct the chrominance signal processor 15 to display certain characters or information on the CRT 16. After selecting the appropriate control item, the microcomputer 12 outputs control data corresponding to the control item via a serial data (SDA) line and a clock signal via a serial clock (SCL) line. The various control items and the manner in which the optimum values of the control data corresponding to the control items are preset during the manufacture of the television 10 will be described in more detail later.

The character data generator 14 inputs horizontal and vertical synchronization signals H and V generatedby the chrominance signal processor 15 and inputs font, color, location, and size information from the microcomputer 12 via the SDA and/or SCL lines. Subsequently, the generator 14 generates character data which corresponds to the received signals and information. For example, the character data generator 14 may generate red (R), green (G), blue (B), and fast blanking (FB) signals which correspond to character data to be displayed.

The tuner 17 tunes the television test signal output from the automatic connector 50, and the video detector 18 detects the television test signal output from tuner 17. Subsequently, the detector 18 outputs a video signal which corresponds to the television test signal.

The chrominance signal processor 15 inputs the R, G, B, and FB signals from the character data generator 14, the video signal from the video detector 18, and control data of one of the control items from the microcomputer 12. Subsequently, the processor 15 displays the character data corresponding to the R, G, B, and FB signals output from the generator 14 and/or displays the video signal output directly from the detector 18. Also, the character data or video signal may be displayed in accordance with the control data corresponding to the selected control item, and the optimum preset values of the control data corresponding to all of the control items are stored in the $E^2PROM$ 13.

The camera 20 comprises a pickup 21 and a camera signal processor 22. The pickup 21 detects the location of the television 10 relative to the camera 20, detects the character data and video signal displayed on the screen of the television 10, and outputs signals corresponding to the detected information. The processor 22 receives and processes the signals output from the pickup 21.

The bus control facility 30 comprises a video signal processor 31, a modified personal computer 32, a remote control signal generator 33, a PC monitor 34, and a television test signal generator 35. The video signal processor 31 receives and processes the signals output from the camera signal processor 22 and outputs the processed signals to the modified personal computer 32. The computer 32 inputs the processed signals, determines the status of the information displayed on the screen of the television 10 based on such signals, and outputs various control signals. For example, the computer 32 outputs signals to the PC monitor 34 so that the monitor 34 can display information relating to the status of the information displayed on the screen of the television 10. Also, the computer 32 outputs control signals to the remote control signal generator 33 to instruct the generator 33 to create various remote control signals. In addition, the computer 32 outputs signals to the television test signal generator 35 to instruct the generator 35 to generate the television test signal.

The factory remote controller 40 inputs the remote control signals from remote control signal generator 33 and transmits corresponding remote control signals to the remote control signal receiver 11 of the television 10. Such remote control signals may set the television 10 in an automatic factory mode for testing the operation of the various function control units. In the automatic factory mode, the microcomputer 12 may output control data which corresponds to a selected control item that causes the function control units to display information on the screen. Subsequently, the camera 20 can detect the displayed information, and the control bus facility 30 can to determine if the control item properly displays information in accordance with the control data. Furthermore, the remote control signals output from the factory remote controller 40 may comprise function control signals which cause the microcomputer 11 to select different control items.

The automatic connector 50 receives a control signal from the modified personal computer 32 to automatically connect the television 10 to the bus control facility 30. In addition, the connector 50 inputs the television test signal from the television test signal generator 35 via the television test signal cable and transmits the test signal to the tuner 17 of the television 10.

In the illustrative embodiment described above, the function control units include the E²PROM 13, the character data generator 14, and the chrominance signal processor 15. However, the SDA and SCL lines may also connect additional or alternative function control units to the microcomputer 12.

Figure 4:
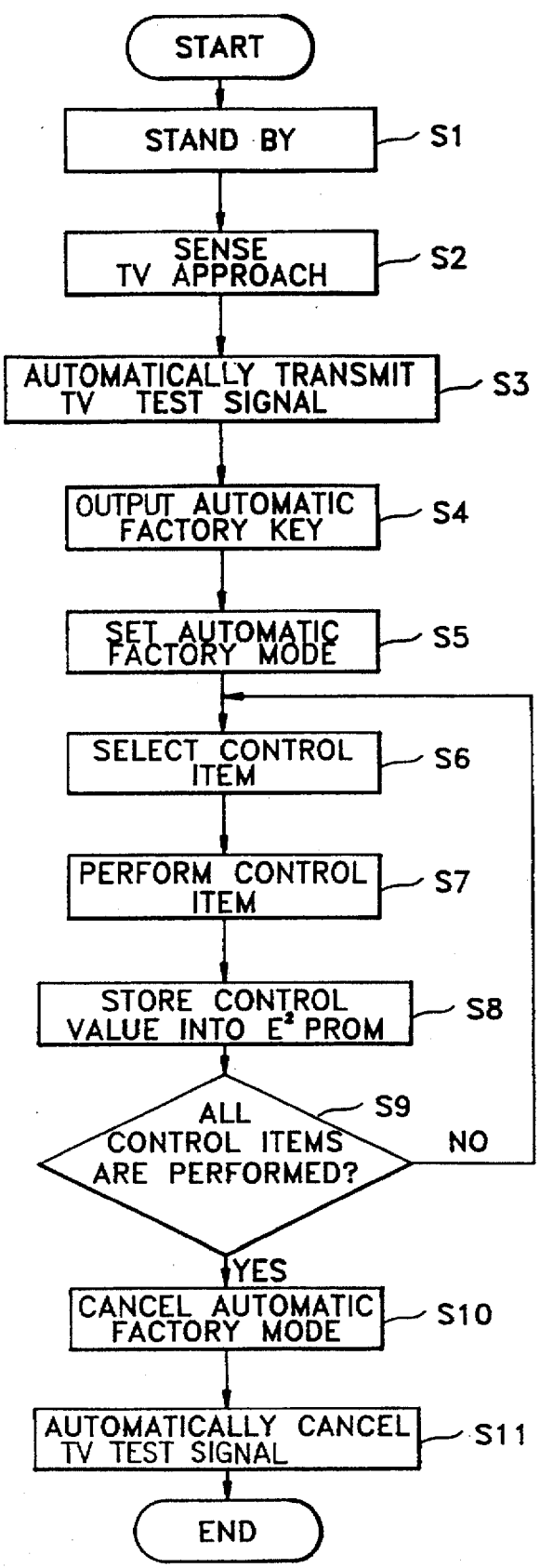
FIG. 4 is a flow chart illustrating an automated method for producing a bus-controlled television according to the present invention.

FIG. 4 shows a flow chart of an automated method for producing the bus-controlled television 10 of the present embodiment. The method will also be explained in conjunction with FIGS. 2 and 3.

As illustrated in FIG. 4, the camera 20 waits in a standby state (step S1) until it detects the television 10 approaching the system on the conveyor (step S2). Upon detecting the television 10, the camera 20 outputs a corresponding signal to the bus control facility 30, and the facility 30 outputs a control signal to automatic connector 50 in order to connect the television 10 to the bus control facility 30. Then, the facility 30 outputs the television test signal to the television 10 via the connector 50 (step S3).

In the present embodiment, the function control units are tested by displaying the television test signal in accordance with the bus control items. An example of the various bus control items which control the display of the television test signal are as shown in the following table.

| key | bus control item |
|-----|------------------|
| 1 | RD (red-drive) |
| 2 | GD (green-drive) |
| 3 | BD (blue-drive) |
| 4 | RC (red-cutoff) |
| 5 | GC (green-cutoff) |
| 6 | BC (blue-cutoff) |
| 7 | SB (sub-brightness |
| 8 | VA (vertical-amplitude) |
| 9 | VS (vertical-shift) |
| 10 | HS (horizontal-shift) |

After the television test signal is input to the tuner 17 of the television 10, the bus control facility 30 controls the factory remote controller 40 such that the controller 40 outputs a remote control signal which corresponds to the factory mode key and the recall key (step S4). After such remote control signal is input by the television 10, the television 10 is set in the automatic factory mode (step S5). In order to perform the function above, the factory remote controller 40 preferably comprises a receiver for receiving the remote control signal from the remote control signal generator 33 and a transmitter for transmitting a corresponding signal to the remote control signal receiver 11. An example of a remote controller 40 which comprises such a receiver and a transmitter is disclosed in U.S. Pat. No. 5,045,843, which is incorporated herein by reference for all purposes.

In the automatic factory mode, the television 10 is capable of being tested to determine if it properly displays the television test signal output from the bus control facility 30 and/or the character data output from the character data generator 14. Furthermore, if the television 10 improperly displays the test signal or character data, the values of the control data which corresponds to the selected control item currently controlling the function control units can be changed until the test signal or character data is correctly displayed on the CRT 16.

After the system has been set in the automatic factory mode, the control items shown in the above table are selected by outputting signals from the factory remote controller 40 (step S6). For example, if the red-drive control item RD is to be used to control the displayed information, the numerical key "1" may be depressed on the controller 40. Also, the control items may be selected by implementing a program which sequentially outputs control signals corresponding to the numerical keys "1" through "9" to the television 10 via the factory remote controller 40.

An illustrative example of how a numerical key signal is processed is described below. If a remote control signal relating to the numerical key "2" is output to the television 10, the remote control signal receiver 11 receives such signal and outputs it to the microcomputer 12. Subsequently, the microcomputer 12 determines that the signal relates to the green drive control item GD and outputs the control data which corresponds to the green drive control item GD on the serial data line SDA. As a result, the character data generator 14 generates character data corresponding to the characters "GD" and the chrominance signal processor 15 displays the character data on the CRT 16. Furthermore, the processor 15 displays the television test signal in accordance with the control data corresponding to the green drive control item GD. When the character data and test signal are displayed on the CRT 16, the camera 20 inputs the image of the displayed information and outputs a corresponding signal to the bus control facility 30. As a result, the facility 30 determines if the values of the control data of the control item GD cause the processor 15 to correctly display the character data and video signal on the CRT 16. If the information is improperly displayed, the values of the control data corresponding to the control item GD may be varied by instructing the factory remote controller 40 to output appropriate signals (step S7). For instance, the value of the control data for the item GD may be adjusted by pressing the volume up key or the volume down key on the factory remote controller 40. After the value of the control data for the control item GD is adjusted such that the character data and video signal are properly displayed, the value is stored in the $E^2PROM$ 13 of television 10 (step S8).

Subsequently, the bus control facility 30 determines if the television test signal has been displayed and evaluated in accordance with all of the control items (step S9). If all of the control items have not been performed by the function control units, the process returns to step S6 to display the television test signal in accordance with one of the remaining control items. However, if all of the control items have been performed, the automatic factory mode is cancelled by instructing the remote controller 40 to output an appropriate signal (step S10). For example, the controller 40 may output a remote control signal which corresponds to the depression of the factory mode key or a power key.

After the automatic factory mode has been cancelled, the bus control facility 30 outputs a control signal via the control cable to instruct the automatic connector 50 to disconnect the television 10 and the bus control facility 30. As a result, the transmission of the television test signal to the television 10 is prevented (step S11).

In some cases, when the character data and video signal are both displayed on the CRT 16, the character data may overlap and interfere with the video signal. Therefore, when information is displayed on the CRT 16, the character data may be blanked so that the video signal can be displayed without interference.

As described above, the present invention enables the a bus-controlled television to be produced via high-speed automation. As a result, the television can be manufactured more efficiently at a lower cost.

It is to be understood that the above described embodiments of the invention are merely illustrative and that modifications of such embodiments may occur to those skilled in the art. Accordingly, this invention is not to be regarded as limited to the embodiments disclosed herein, but is to be limited only as defined by the appended claims.

What is claimed is:

1. An automated production apparatus for producing a bus-controlled television having a microcomputer and function control units which are connected to said microcomputer, said automated production apparatus comprising:

a camera, wherein said camera photographs a predetermined area near said automated production apparatus and outputs an approach detection signal indicating whether or not said television is located within said predetermined area and wherein said camera photographs information displayed on a screen of said television when said television is located at a predetermined position within said predetermined area and outputs a screen state signal based on said information;

a bus control facility which inputs said approach detection signal and said screen state signal and generates a television test signal, a first remote control signal for setting said television in an automatic factory mode, a second remote control signal for selecting a selected control item of a plurality of control items, and a connection control signal, wherein said connection control signal is generated in accordance with said approach detection signal and indicates when said television is within said predetermined area and wherein said plurality of control items control operations of said function control units;

an automatic connector which inputs said television test signal and said connection control signal and establishes a connection between said bus control facility and said television when said television is located within said predetermined area so that said television test signal can be transmitted to said television via said automatic connector; and a remote controller which receives said first and second remote control signals from said bus control facility and outputs first and second function remote control signals to said television, wherein said first function remote control signal sets said television in said automatic factory mode and said second function remote control signal represents said selected control item for controlling functions of said function control units.

2. The automated production apparatus for producing a bus-controlled television according to claim 1, wherein said television comprises:

a microcomputer which sets said television in said automatic factory mode when said television receives said first function control signal and which outputs control data corresponding to said selected control item when said television receives said second function control signal;

a video processor which receives said television test signal generated by said bus control facility, processes said television test signal into a processed television signal, and displays said processed television signal on said screen; and a memory for storing said control data output by said microcomputer.

3. The automated production apparatus for producing a bus-controlled television according to claim 2, wherein said video processor inputs said control data output by said microcomputer and displays said processed television signal on said screen in accordance with said control data.

4. The automated production apparatus for producing a bus-controlled television according to claim 3, wherein said camera photographs said processed television signal displayed on said screen and outputs a corresponding first screen state signal, and wherein said bus control facility inputs said first screen state signal and determines if said processed television signal is properly displayed on said screen in accordance with said control data.

5. The automated production apparatus for producing a bus-controlled television according to claim 4, wherein said bus control facility generates a third remote control signal when said processed television signal is not properly displayed on said screen and outputs said third remote control signal to said remote controller, wherein said third remote control signal indicates an amount by which to adjust said control data that corresponds to said selected control item, wherein said remote controller generates a third function remote control signal based on said third remote control signal and outputs said third function remote control signal to said television, wherein said microprocessor adjusts said control data based on said third function remote control signal to generate new control data corresponding to said selected control item and outputs said new control data to said video processor and said memory, and wherein said memory stores said new control data corresponding to said selected control item.

6. The automated production apparatus for producing a bus-controlled television according to claim 5, wherein said processed television signal is displayed on said screen based on said new control data, and wherein said camera photographs said processed television signal displayed on said screen and outputs a second screen state signal which corresponds to said processed television signal displayed on said screen in accordance with said new control data.

7. The automated production apparatus for producing a bus-controlled television according to claim 4, wherein said bus control facility determines if said processed television signal has been properly displayed with respect to all of said plurality of control items, wherein, if said processed television signal has been displayed properly with respect to said all of said plurality of control items, said bus control facility generates a first cancel signal and outputs said first cancel signal to said remote controller, said remote controller outputs a second cancel signal to said television based on said first cancel signal, and said microcomputer cancels said automatic factory mode based on said second cancel signal, and wherein, if said processed television signal has not been displayed properly with respect to said all of said plurality of control items, said bus control facility generates a remaining remote control signal which corresponds to a remaining control item and outputs said remaining remote control to said remote controller, said remote controller outputs a remaining function remote control signal to said television based on said remaining remote control signal, and said microcomputer outputs remaining control data corresponding to said remaining control item based on said remaining function remote control signal.

8. The automated production apparatus for producing a bus-controlled television according to claim 7, wherein said video processor inputs said remaining control data output by said microcomputer and displays said processed television signal on said screen in accordance with said remaining control data of said remaining control item.

9. The automated production apparatus for producing a bus-controlled television according to claim 7, wherein said bus control facility generates a connection cancel signal after said automatic factory mode has been cancelled and outputs said connection cancel signal to said automatic connector, and wherein said automatic connector disconnects said connection between said television and said bus control facility based on said connection cancel signal.

10. The automated production apparatus for producing a bus-controlled television according to claim 4, wherein said automated production apparatus enables a user to generate a third function remote control signal by pressing a button on said remote controller when said processed television signal is not displayed properly with respect to said control data, wherein said remote controller outputs said third function remote control signal to said television, wherein said third function remote control signal indicates an amount by which to adjust said control data of said selected control item, and wherein said microprocessor adjusts said control data based on said third function remote control signal to generate new control data corresponding to said selected control item and outputs said new control data to said video processor and said memory, and wherein said memory stores said new control data of said selected control item.

11. A method of testing various functions performed by a bus-controlled television by utilizing control items, wherein said television is produced by an automated production apparatus comprising an bus control facility, wherein said control items control said various functions to be tested, and wherein said method comprises the steps of:

(a) sensing if said television has moved into a predetermined area located near said automated production apparatus;

(b) generating a television test signal via said bus control facility and transmitting said television test signal to said television when said television has moved into said predetermined area;

(c) generating a first remote control signal and transmitting said first remote control signal to said television when said television has moved into said predetermined area, wherein said first remote control signal sets said television into an automatic factory mode which enables said various functions to be tested;

(d) generating a second remote control signal and transmitting said second remote control signal to said television, wherein said second remote control signal selects a selected control item of said control items when said television is set in said automatic factory mode;

(e) causing said television to perform a function of said various functions in accordance with control data corresponding to said selected control item;

(f) determining if said function has been properly performed in accordance with said control data;

(g) if said function has not been properly performed in accordance with said control data,
 (g1) generating an adjustment remote control signal and transmitting said adjustment remote control signal to said television, wherein said adjustment remote control signal indicates an amount by which to adjust said control data;
 (g2) adjusting said control data to produce new control data based on said adjustment remote control signal, wherein said new control data corresponds to said selected control item;
 (g3) causing said television to perform said function in accordance with said new control data;
 (g4) determining if said function has been properly performed in accordance with said new control data;
 (g5) repeating said steps (g1) to (g4) if said function has not been properly performed in accordance with said new control data;
 (g6) designating said new control data as preset control data for said selected control item if said function has been properly performed in accordance with said new control data;

(h) if said function has been properly performed in accordance with said control data, designating said control data as said preset data; and (i) storing said preset data of said selected control item.

12. The method according to claim 11, further comprising the steps of:

(j) determining if all of said control items have been utilized to control at least one of said various functions;

(k) if said all of said control items have been utilized, (k1) generating a cancel remote control signal and transmitting said cancel remote control signal to said television to cancel said automatic factory mode;

(k2) preventing said television test signal from being transmitted to said television;

(l) if said all of said control items have not been utilized, (l1) generating a remaining remote control signal and transmitting said remaining remote control signal to said television, wherein said remaining remote control signal designates one of said control items which has not been previously utilized as said selected control item;

(l2) repeating said steps (e) through (l).

13. The method according to claim 11, wherein said step (f) of determining if said function has been properly performed in accordance with said control data comprises the steps of:

(f1) displaying said television test signal on a screen of said television in accordance with said control data;

(f2) photographing said television test signal displayed on said screen via a camera;

(f3) outputting a screen state signal from said camera to said bus control facility, wherein said screen state signal represents said television test signal displayed on said screen;

(f4) determining if said television test signal has been properly displayed on said screen in accordance with said control data based on said screen state signal.

14. The method according to claim 12, wherein said step (f) of determining if said function has been properly performed in accordance with said control data comprises the steps of:

(f1) displaying said television test signal on a screen of said television in accordance with said control data;

(f2) photographing said television test signal displayed on said screen via a camera;

(f3) outputting a screen state signal from said camera to said bus control facility, wherein said screen state signal represents said television test signal displayed on said screen;

(f4) determining if said television test signal has been properly displayed on said screen in accordance with said control data based on said screen state signal.

15. The method according to claim 14, wherein said step (g4) of determining if said function has been properly performed in accordance with said new control data comprises the steps of:

(g4a) displaying said television test signal on screen of said television in accordance with said new control data;

(g4b) photographing said television test signal displayed on said screen via said camera;

(g4c) outputting a new screen state signal from said camera to said bus control facility, wherein said new screen state signal represents said television test signal displayed on said screen in accordance with said new control data;

(g4d) determining if said television test signal has been properly displayed on said screen in accordance with said new control data based on said new screen state signal.

* * * * *